United States Patent

Skarlupka

[11] Patent Number: 5,975,277
[45] Date of Patent: Nov. 2, 1999

[54] LIM DRIVE CONVERSION KIT

[75] Inventor: Joseph H. Skarlupka, White Lake, Wis.

[73] Assignee: Motion Systems, L.C., White Lake, Wis.

[21] Appl. No.: 08/961,614

[22] Filed: Oct. 31, 1997

[51] Int. Cl.⁶ .................. B65G 47/10; B65G 47/46; B65G 35/00; B65G 15/60
[52] U.S. Cl. ............... 198/370.04; 198/619; 198/805
[58] Field of Search .................. 198/365, 370.04, 198/619, 805

[56] References Cited

U.S. PATENT DOCUMENTS

| | | |
|---|---|---|
| 2,609,915 | 9/1952 | De Burgh . |
| 3,426,887 | 2/1969 | Ward et al. . |
| 3,731,166 | 5/1973 | Inuzuka et al. . |
| 3,788,447 | 1/1974 | Stephanoff . |
| 4,792,036 | 12/1988 | Heidelberg . |
| 4,856,642 | 8/1989 | Nicholson et al. ............ 198/365 |
| 5,054,601 | 10/1991 | Sjogren et al. ............ 198/365 |
| 5,103,968 | 4/1992 | Skarlupka . |
| 5,295,568 | 3/1994 | Saito et al. ............ 198/363 X |

*Primary Examiner*—William E. Terrell
*Assistant Examiner*—K W Bower
*Attorney, Agent, or Firm*—Lathrop & Clark LLP

[57] ABSTRACT

A conversion frame mounts to pre-existing bolt holes in a conventional USPS tilt-tray carriage with bolts that extend into the holes which previously supported vertical axis rollers for the mechanical drive tilt-tray carriage. The conversion frame has a forward foot and a rear foot, both of which connect to a ferromagnetic driving plate. The feet elevate a connection platform above the driving plate, and provide clearance for the rotation of four positioning rollers which extend sidewardly from the platform on protruding ears. The conversion kit allows the rapid change-over of a conventional mechanical drive tilt-tray sorter system to a LIM drive system with maximum re-use of parts.

14 Claims, 3 Drawing Sheets

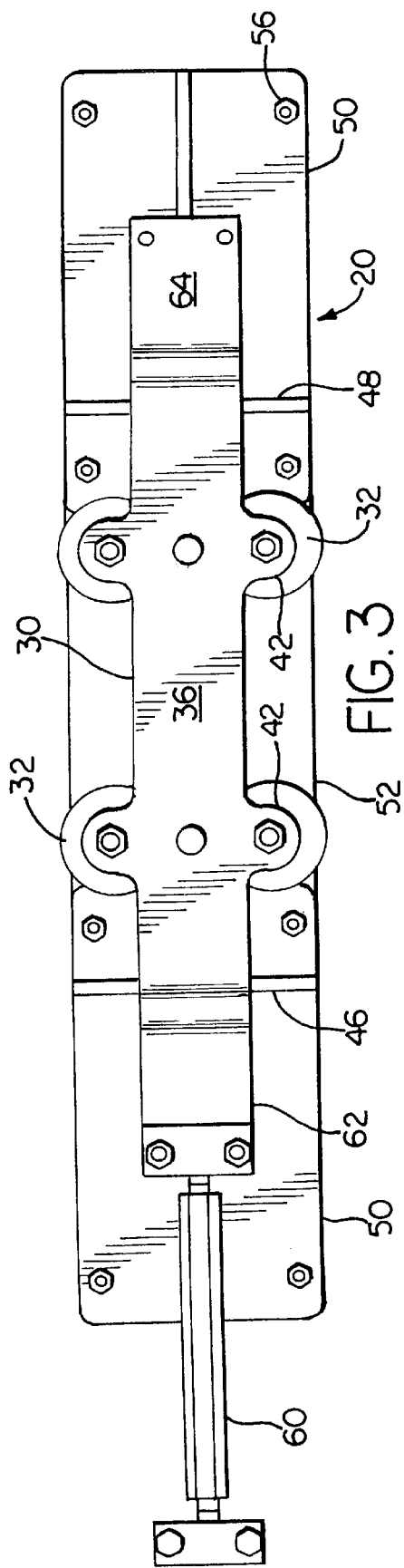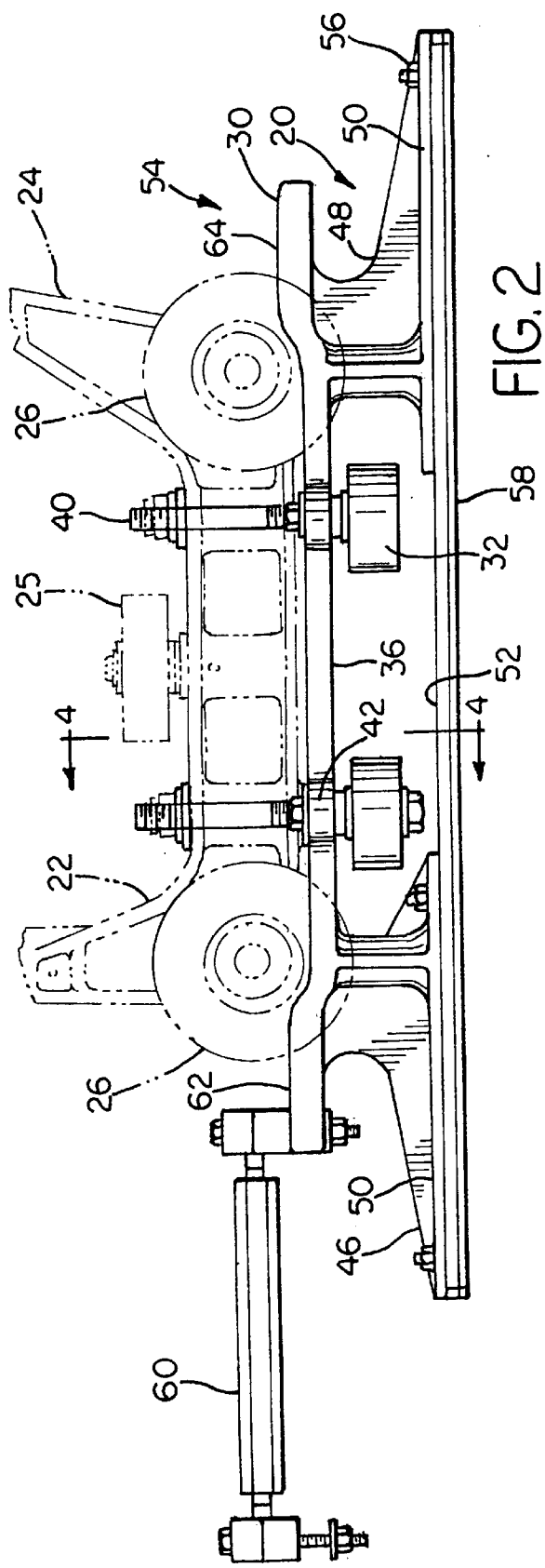

LIM DRIVE CONVERSION KIT

FIELD OF THE INVENTION

The present invention relates to conveyor apparatus in general, and to apparatus for converting tilt-sorter carriages for use in Linear Induction Motor (LIM) Drive conveyors in particular.

BACKGROUND OF THE INVENTION

Tilt tray sorters are employed where it is necessary to sort a stream of incoming parcels to a number of different destinations. Individual tilt tray carriages are linked together into a looped train which is supported on a closed loop track. Discharge stations are located adjacent inclined chutes around the track. Each discharge station corresponds to a particular destination or sorting category of the conveyed parcel. Each carriage receives a parcel at a load station. As parcels are loaded on a particular carriage, a digital controller is supplied with data to indicate the destination chute at which the parcels are to be unloaded. As the train advances around the track, air operated tippers engage the tiltable tray of a carriage when it reaches its programmed destination. The tilted tray discharges the carriage contents onto the inclined chute and then returns to an upright position. The discharged parcels may then proceed to additional processing steps, while the empty carriage returns to the load station to receive a new parcel.

The earliest tilt tray sorters used mechanical chain drives. Such drives offered the benefits of secure physical connection between the drive and the carriage, and represent a very old and well-understood technology. Mechanical chain drive type tilt tray sorters have been used at a number of locations for decades. For example, the United States Postal Service (USPS) has over 20 bulk mail centers, each with a number of tilt tray sorter installations.

Advancements in conveyor technology have made the LIM drive particularly suited for use in tilt tray sorters. In a linear induction motor drive, the train of carriages is still supported on a looped track, but the carriages do not make physical contact with the drive. Instead, the drive motors are fixed, and act on ferromagnetic carrier plates connected to each carriage. The drive motors are positioned at intervals around the track and accelerate the carriages as they pass over. The LIM drives offers the advantages of reduced noise levels, increased reliability as failure of any individual LIM drive motor will not cause the train to halt, and improved system life. A LIM drive motor is extremely reliable, as it contains no moving parts. Although new tilt tray sorter installations can be designed as LIM drive systems, there remain the many current mechanical drive technology installations which represent a significant investment not only in tracks and supports, but in tilt tray carriages. The USPS alone, for example, has tens of thousands of tilt tray carriages, representing an investment of many millions of dollars.

What is needed is a mechanism which permits the rapid and cost-effective conversion of mechanical drive tilt tray sorters to LIM drive sorters.

SUMMARY OF THE INVENTION

The conversion kit of this invention has a frame which mounts to pre-existing bolt holes in a conventional USPS tilt-tray carriage. The conversion frame bolts extend into the holes which previously supported vertical axis rollers for the mechanical drive tilt-tray carriage. The conversion frame has a forward foot and a rear foot, both of which connect to a ferromagnetic driving plate. The feet elevate a connection platform above the driving plate, and provide clearance for the rotation of four positioning rollers which extend sidewardly from the platform on protruding ears. The conversion kit allows the rapid change-over of a conventional mechanical drive tilt-tray sorter system to a LIM drive system with maximum re-use of parts.

It is an object of the present invention to provide a LIM drive sorter which accepts conventional mechanical drive tilt tray carriages.

It is also an object of the present invention to provide LIM drive conversion frame to which a conventional mechanical drive tilt tray carriage may be connected.

It is a further object of the present invention to provide a LIM drive system for a tilt-tray sorter which can be installed as a retrofit to an existing mechanical drive system.

Further objects, features and advantages of the invention will be apparent from the following detailed description when taken in conjunction with the accompanying drawings.

BRIEF DESCRIPTION OF THE DRAWINGS

FIG. 2 is a side elevational view of the converted assembly of FIG. 1.

FIG. 3 is a top plan view of the conversion kit of FIG. 1.

DESCRIPTION OF THE PREFERRED EMBODIMENT

Figure 1:
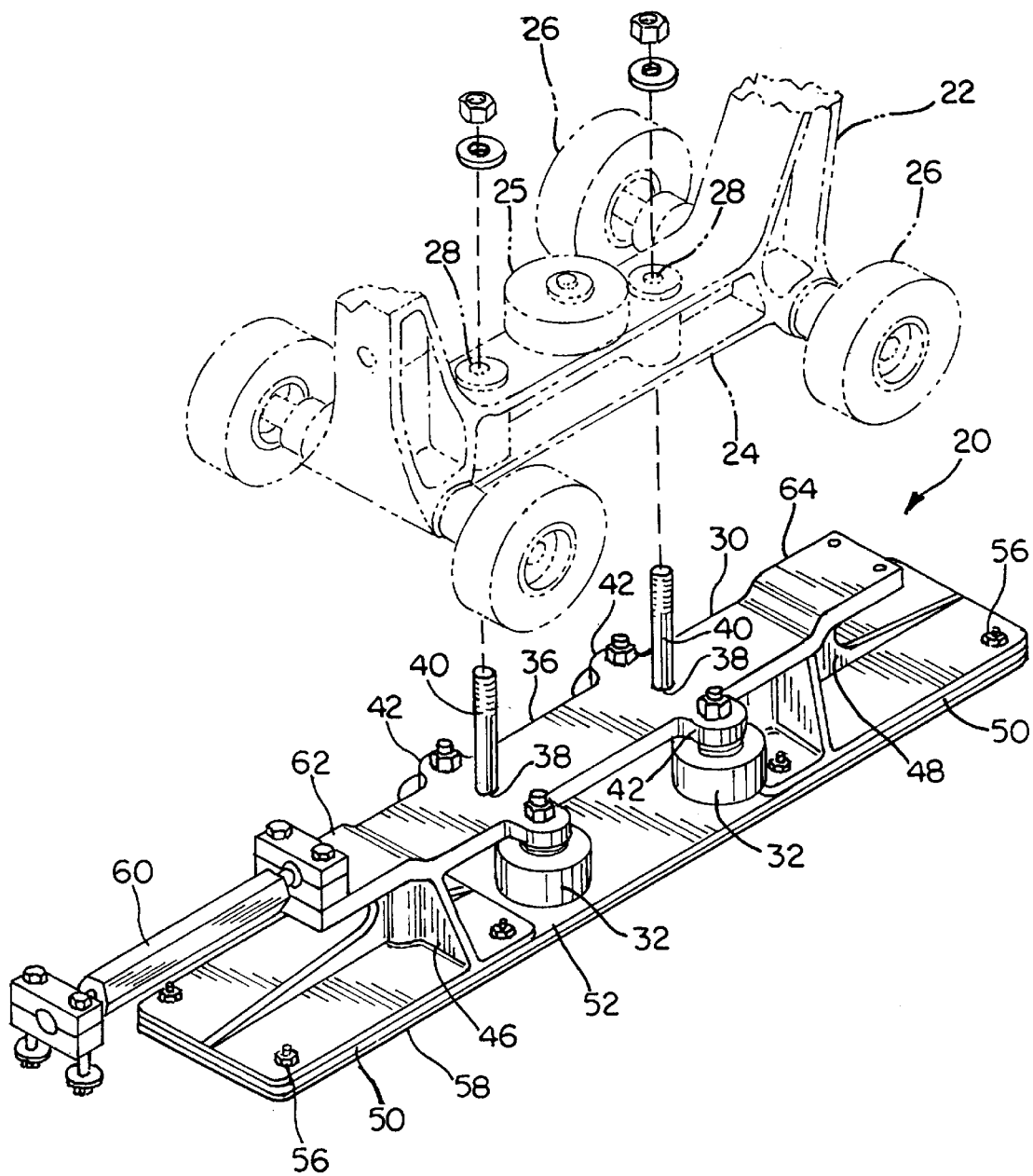
FIG. 1 is an isometric view of the LIM conversion kit of this invention, with a conventional USPS carrier shown exploded above.
Figure 4:
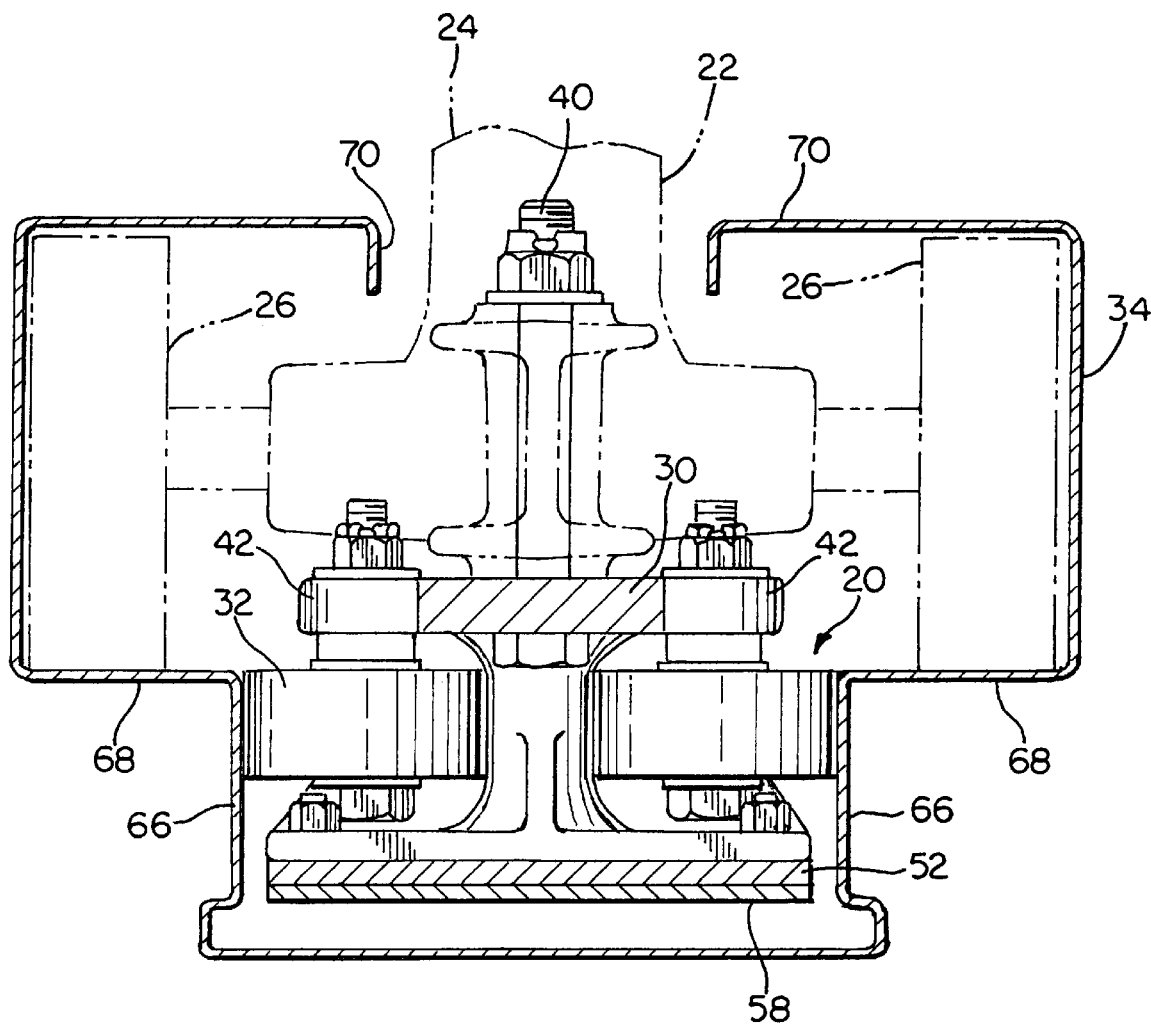
FIG. 4 is a cross-sectional view of the converted assembly of FIG. 2 taken along section line 4—4 and shown in relation to a LIM drive track section.

Referring more particularly to FIGS. 1–4, wherein like numbers refer to similar parts, a LIM drive conversion kit 20 is shown in FIG. 1 in relation to a conventional USPS tilt-tray sorter carriage 22. The USPS carriage 22 has a body 24 to which four rollers 26 are mounted to rotate about horizontal axes. A top roller 25 is also mounted to the body 24, and rotates about a vertical axis. The conventional USPS carriage 22 has two vertically extending mounting holes 28 formed in the body 24. The mounting holes 28 in a conventional mechanical drive system receive the shafts of two lower rollers (not shown) which rotate about vertical axes and engage elements of the mechanical drive system track. The conversion kit 20 of this invention provides a cast metal frame 30, preferably aluminum, which is configured to be securely fastened to the USPS carriage 22 in such a way to make use of the carriage rollers 26 while at the same time positioning appropriate side rollers 32 for engagement with the LIM drive track 34, and supporting an elongated ferromagnetic driving plate 52, as shown in FIG. 4.

The frame 30 has a generally horizontal mounting platform 36 which engages beneath the USPS carriage body 24. The platform 36 has two vertically extending mounting holes 38, one positioned beneath each of the USPS carriage mounting holes 28. Bolt fasteners 40 extend through the aligned mounting holes 28, 38 and securely fasten the USPS carriage 22 to the conversion frame 30.

Four ears 42 extend sidewardly from the platform 36 to rotatably mount two side rollers 32 on each side of the conversion frame 30. As shown in FIG. 2 a supporting forward foot 46 extends downwardly from the front end of the platform 36, and a rear foot 48 extends downwardly from the rear end of the platform. Each foot terminates in a planar segment 50 which overlies a driving plate 52. The driving plate 52 is a generally rectangular member constructed of ferromagnetic material such as steel and which is designed to interact with the linear induction motor drive for electromagnetic propulsion of the combined conversion kit-USPS carriage assembly 54 along the tilt-tray sorter track. Fasteners 56 connect the driving plate 52 and an underlying aluminum cover plate 58 to the conversion frame 30. The ears 42 support the side rollers 32 above the driving plate 52 for free rotation.

The converted assemblies 54 are connected, one to another, in a continuous loop along the LIM drive conveyor track. A link 60 extends from a front flange 62 positioned forward of the platform 36 to a rear flange 64 of an assembly 54 ahead on the track. The links 60 are connected with universal-type joints to allow the assemblies to follow a track which includes curves and changes in elevation.

In a typical mechanical drive installation, the customer will have a considerable investment in tracks, pneumatic tippers, mechanical carriages and the like. The conversion kit 20 permits the recovery of a large part of the value of the conventional mechanical drive carriages. To convert the conventional carriage 22 for use with a LIM drive system, the lower rollers are removed from the carriage, and the carriage is positioned over the conversion frame to align the carriage holes 28 with the mounting holes 38 in the frame platform. Two bolts 40 are inserted through the aligned holes and secured with washers and nuts. The assembly 54 is then ready to be linked to another assembly 54 as part of a LIM drive system.

The converted assembly 54 operates with the LIM drive track 34 as shown in FIG. 4. The track 34 is of generally constant cross section, and has two vertical walls 66 which engage with the side rollers 32. Horizontal walls 68 extend sidewardly outwardly from the vertical walls 66, and support the rollers 26 which are mounted to the carriage 22. An L-shaped wall 70 extends inwardly from each vertical wall 66, and together restrain and engage the top roller 25 mounted to the carriage. The conversion kit 20 permits the assembly 54 to operate with a track having horizontal walls 68 which are spaced apart a significantly greater amount than the equivalent horizontal walls of a mechanical track, thus allowing a wider driving plate and the use of fewer LIM drive motors for a given length of track.

In addition, as best shown in FIG. 2, the conversion frame 30 is substantially longer than the body 24 of the USPS carriage. In particular the planar segments 50 extend frontwardly and rearwardly of the carriage, and permit a lengthened driving plate 52 to be mounted to the carriage. The two frame feet 46, 48, which are connected to one another by the platform 36, when fixed to the driving plate substantially stiffen the driving plate, and permit effective operation of the combined assembly without distortion.

A conventional USPS carriage is defined for purposes of the claims as a carriage of the type shown in the drawings and existing at U.S. Postal Service Facilities as of April 1996.

It is understood that the invention is not limited to the particular construction and arrangement of parts herein illustrated and described, but embraces such modified forms thereof as come within the scope of the following claims.

I claim:

1. A tilt tray conveyor system comprising:
   a plurality of conventional USPS carriages, each carriage having a plurality of rotatable rollers mounted thereto;
   a track along which the carriages are movable;
   a plurality of conversion frames, one connected to each conventional USPS carriage, the frames being connected by fasteners which extend from the conversion frame through pre-existing bolt holes in the conventional USPS carriages, wherein each conversion frame has downwardly extending portions which extend below the level of any roller on the carriage;
   a linear induction motor driving plate fixed to the downwardly extending portions of each frame, and
   a plurality of linear induction motors positioned along the track, the linear induction motors being positioned to electromagnetically engage the drive plates, to propel the carriages along the track, wherein the frame has a horizontal platform to which the carriage is mounted, and wherein the platform has two sidewardly extending ears on each side, and wherein a side wheel is mounted for rotation about a substantially vertical axis to each of the ears.

2. A tilt tray conveyor system comprising:
   a plurality of conventional USPS carriages, each carriage having a plurality of rotatable rollers mounted thereto;
   a track along which the carriages are movable;
   a plurality of conversion frames, one connected to each conventional USPS carriage, the frames being connected by fasteners which extend from the conversion frame through pre-existing bolt holes in the conventional USPS carriages, wherein each conversion frame has downwardly extending portions which extend below the level of any roller on the carriage;
   a linear induction motor driving plate fixed to the downwardly extending portions of each frame, and
   a plurality of linear induction motors positioned along the track, the linear induction motors being positioned to electromagnetically engage the drive plates, to propel the carriages along the track, wherein the fasteners which connect the frame to the carriage comprise two bolts which extend through upwardly opening holes defined by the frame.

3. A kit for conversion of a conventional USPS tilt-tray sorter carriage for use with a linear induction motor drive conveyor system, wherein the conventional USPS carriage has a body with two vertically extending throughholes which open downwardly, the conversion kit comprising:
   a frame having a central platform with a front foot which extends frontwardly of the central platform and a rear foot which extends rearwardly from the central platform, the front foot and rear foot extending downwardly from the central platform and terminating in horizontally extending mounting segments;
   fasteners which extend upwardly from the frame central platform and into the USPS carriage body throughholes for secure connection of the frame to the USPS carriage;
   a ferromagnetic driving plate fixed to the front foot and the rear foot beneath the frame; and
   a plurality of side rollers mounted to the frame platform for rotation about substantially vertical axes, wherein the platform has two sides, and at least one side roller is positioned on each side of the platform.

4. The kit of claim 3 wherein the frame platform has two sideward extending ears on each side, and wherein a side wheel is mounted for rotation about a substantially vertical axis to each of the ears.

5. The kit of claim 2 wherein the front foot mount segment extends frontwardly of the connected USPS carriage, and wherein the rear foot mounting segment extends rearwardly of the USPS carriage, the front foot mounting segment being spaced in the direction of carriage travel from the rear foot mounting segment.

6. The kit of claim 3 further comprising an aluminum plate fixed beneath the driving plate.

7. The kit of claim 3 wherein the fasteners which extend from the frame platform comprise two bolts which extend through upwardly opening holes defined by the platform.

8. The kit of claim 3 wherein the frame platform has a front flange which extends frontwardly of the platform to extend forward of the connected carriage, and wherein the frame platform has a rear flange which extends rearwardly of the platform to extend behind the connected carriage, and further comprising a link which extends from the front flange for connection to the rear flange of another kit ahead, the link permitting relative displacement between connected frames.

9. A converted carriage assembly for use in a linear induction motor drive conveyor system, the assembly comprising:

a conventional tilt-tray sorter carriage having a body with two vertically extending throughholes which open downwardly;

a conversion frame having a central platform with a front foot which extends downwardly from the central platform and a rear foot which extends downwardly from the central platform, the front foot and rear foot terminating in horizontally extending mounting segments;

fasteners which extend upwardly from the frame central platform and into the carriage body throughholes for secure connection of the frame to the carriage;

a ferromagnetic driving plate fixed to and extending between the front foot and the rear foot beneath the frame; and a plurality of side rollers mounted to the frame platform for rotation about substantially vertical axes.

10. The assembly of claim 9 wherein the frame platform has two sidewardly extending ears on each side, and wherein a side wheel is mounted for rotation about a substantially vertical axis to each of the ears.

11. The assembly of claim 9 wherein the front foot mount segment extends frontwardly of the carriage, and wherein the rear foot mounting segment extends rearwardly of carriage, the front foot mounting segment being spaced in the direction of carriage travel from the rear foot mounting segment.

12. The assembly of claim 9 further comprising an aluminum plate fixed beneath the driving plate.

13. The assembly of claim 9 wherein the fasteners which extend from the frame platform comprise two bolts which extend through upwardly opening holes defined by the platform.

14. The assembly of claim 9 wherein the frame platform has a front flange which extends frontwardly of the platform to extend forward of the carriage, and wherein the frame platform has a rear flange which extends rearwardly of the platform to extend behind the carriage, and further comprising a link which extends from the front flange for connection to the rear flange of another assembly ahead, the link permitting relative displacement between connected frames.

* * * * *